(12) United States Patent
Teh et al.

(10) Patent No.: US 7,409,516 B2
(45) Date of Patent: Aug. 5, 2008

(54) PENDING REQUEST SCOREBOARD FOR OUT-OF-ORDER MEMORY SCHEDULER

(75) Inventors: Chee Hak Teh, Penang (MY); Suryaprasad Kareenahalli, Folsom, CA (US); Zohar Bogin, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 152 days.

(21) Appl. No.: 11/394,462

(22) Filed: Mar. 30, 2006

(65) Prior Publication Data

US 2007/0239955 A1    Oct. 11, 2007

(51) Int. Cl.
*G06F 12/00* (2006.01)

(52) U.S. Cl. .................... 711/169; 711/167; 711/154; 711/105

(58) Field of Classification Search ........................ None
See application file for complete search history.

(56) References Cited

U.S. PATENT DOCUMENTS

| | | | | |
|---|---|---|---|---|
| 5,404,543 A | * | 4/1995 | Faucher et al. | 713/323 |
| 5,893,165 A | * | 4/1999 | Ebrahim | 711/158 |
| 6,023,745 A | * | 2/2000 | Lu | 711/5 |
| 6,741,256 B2 | * | 5/2004 | Emberling | 345/540 |
| 6,799,241 B2 | * | 9/2004 | Kahn et al. | 711/105 |
| 6,901,114 B2 | | 5/2005 | Birth | |
| 2003/0038810 A1 | * | 2/2003 | Emberling | 345/540 |

* cited by examiner

*Primary Examiner*—Kevin Verbrugge
(74) *Attorney, Agent, or Firm*—Lee & Hayes, PLLC

(57) ABSTRACT

Embodiments of a memory scoreboard are presented herein. The memory scoreboard tracks memory requests for each rank and bank of memory being addressed. When there are no pending requests, the scoreboard provides an indication to an idle timer that begins a count down to close a current page of the memory. The idle timer can be configured dynamically to close memory pages and to address dynamically-changing code streams by tracking previous decisions made on page closes.

18 Claims, 6 Drawing Sheets

PENDING REQUEST SCOREBOARD FOR OUT-OF-ORDER MEMORY SCHEDULER

BACKGROUND

Computing devices typically include memory controllers to control access to memory, e.g., by a processor, to read and write data. For instance, memory may be configured as Dynamic Random Access Memory (DRAM), which provides the "main memory" of the computing device that is used to store data for use by the processor, such as computer-executable instructions, data for further processing according to the computer-executable instructions, and so on.

One technique that has been utilized to improve the efficiency of access to the DRAM is to close a "page" to main memory when traffic to the memory has been idle for a predetermined amount of time, which may be referred to as an "idle time". Thus, future requests to the memory will be performed with "page empty" timing and therefore do not encounter additional overhead to close the page before another page is opened. A performance gain, for example, may be encountered when future requests result in more "page misses" (e.g., a different page than the one that is open is subject to a next memory transaction) than "page hits". Therefore, if the "missed" page is already closed, the overhead in requesting another page is minimized.

In order to determine when to close a page, a memory scoreboard may be utilized which indicates whether there are pending requests to the memory, and thus, whether the memory is idle. Traditional techniques which were utilized to provide the scoreboard, however, were inefficient and as such may have a significant gate count that consumes valuable semiconductor resources.

BRIEF DESCRIPTION OF THE DRAWINGS

The same reference numbers are utilized in instances in the discussion to reference like structures and components.

DETAILED DESCRIPTION

In the following discussion, exemplary devices are described which may provide and/or utilize a memory scoreboard. Exemplary procedures are then described which may be employed by the exemplary devices, as well as by other devices without departing from the spirit and scope thereof.

Exemplary Devices

Figure 1:
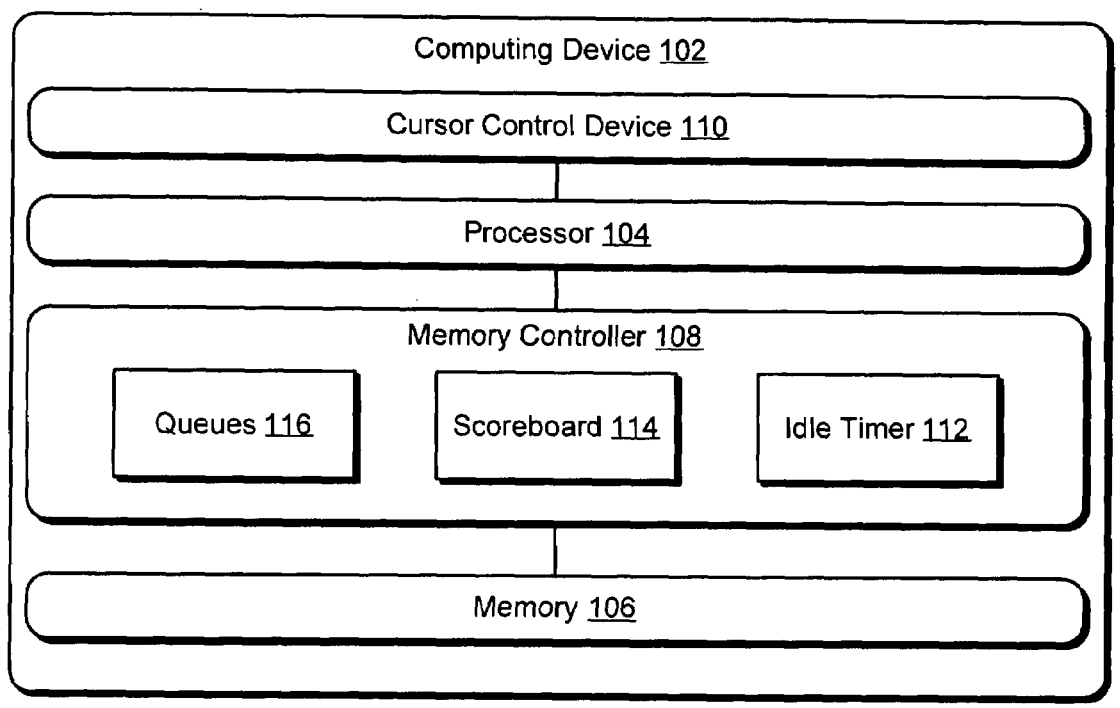
FIG. 1 is an illustration of an exemplary implementation of a computing device that is operable to perform the memory scoreboard techniques.

FIG. 1 illustrates an exemplary implementation 100 of a computing device 102 that is operable to employ memory scoreboard techniques. The computing device 102 may be configured in a variety of ways, such as a traditional desktop computer (e.g., a desktop PC), a server, a notebook computer, a personal information appliance, a graphics card, and so on. Thus, the computing device 102 may be configured as a "thick" computing device having significant processing and memory resources (e.g., a server) to a "thin" computing device having relatively limited processing and/or memory resources, such as a personal information appliance. A wide variety of other configurations are also contemplated.

The computing device 102, as illustrated in FIG. 1, includes a processor 104, memory 106, a memory controller 108 and a cursor control device 110. The cursor control device 110 (e.g., a mouse, touch screen, track pad, and so on) is communicatively coupled to the processor 104 via a bus, such as a host bus of a graphics memory controller hub. The processor 104 may be configured in a variety of ways, and thus, is not limited by the materials from which it may be formed or the processing mechanisms employed therein. For example, the processor may be comprised of semiconductor(s) and/or transistors (e.g., electronic integrated circuits (ICs)), and so on. Additionally, although a single processor 104 is illustrated, the processor 104 may be representative of multiple processors that are communicatively coupled to the memory controller 108 through use of a bus.

Likewise, the memory 106, which may be representative of "main memory" of the computing device 102, is configurable in a variety of ways. For example, memory 106 may be configured as DRAM, which may include synchronous DRAM (SDRAM), Rambus DRAM (RDRAM), Double Data Rate synchronous DRAM (DDR DRAM), and so on.

The memory controller 108 is configured to service "memory requests" (which may also be referred to hereafter as "requests"), which as used herein, refer to a transfer of command and address between an initiator and the memory 106. For example, a "read memory request" is a transfer of data from the memory 106 to an initiator. Processor 104, for instance, may initiate the read memory request (e.g., in response to an input received from the cursor control device 110) to transfer data from the memory 106 to the processor 104. A "write memory request" is a transfer of data from the initiator to the memory 106. Continuing with the previous example, the processor 104 may initiate a write memory request to transfer data from the processor 104 to the memory 106. Control information (e.g., a priority level and a read/write nature of the memory request) may be conveyed as a part of the memory request, through use of a predefined protocol with respect to conveyance of the address, and so on.

The memory controller 108, in an implementation, is configured to transfer data between the memory 106 and the processor 104 through the use of "pages". For instance, a "page" may refer to a block of data that is stored within a row of one or more DRAMs that implement the memory 106. The row in this instance is accessed via a row address provided by the memory controller 108, and then the column address of the particular data being addressed is provided. Another column address may also be used to access additional data within the row without providing the row address again, which may be referred to as a "page hit". Reading or writing additional data from the same row in this manner (which may be referred to as "page mode") provides for less latency when accessing the data, because column accesses may be performed without providing the row address in between the column accesses and the page is already loaded. Thus, this may result in improved efficiency in the utilization of the memory 106.

When a memory read request hits an "open" page, the memory read request is sent to the memory controller 108 where it is serviced. In an implementation, the memory controller 108 records the page (e.g., a row portion of the address) of the current memory request in a priority/state machine unit. If, within an idle time period (further discussion of which may be found below), another memory request is detected and is directed to the same page as the current memory request, which may be detected by comparing the page recorded in priority/state machine unit, then the current data transfer may be continued without closing the page.

The memory controller 108 may then convey an address of the selected memory request to the memory 106 along with corresponding control information via a bus. In an implementation, the control information includes a write-enable line to indicate whether the request is a "read" or "write", a row-address line to indicate a row portion of the address that is being conveyed, and a column address line to indicate the column address that is being conveyed. If the request is a read, the selected data is provided by the memory 106.

When an incoming agent (e.g., the processor 104) accesses another page (i.e., is a "miss"), then a current page (if any) is closed and the other page is accessed by providing a row address of the memory request, then the corresponding column addresses.

As previously described, one technique that may be utilized to improve the efficiency of access to the memory 106 is to close a page to the memory 106 when traffic to the memory has been idle for a predetermined amount of time, which may be referred to as an "idle time". Therefore, future requests to the memory will be performed with "page empty" timing and therefore do not encounter additional overhead to close the page before another page is opened.

In order to determine whether and when to close pages to memory 106, the memory controller 108 may employ an idle timer 112 and a scoreboard 114. The scoreboard 114 is configured to track existence of pending requests stored in queues 116 to the memory 106 that are to be processed by the memory controller 108. For example, the scoreboard 114 may track memory requests for each rank and bank of the memory 106 being addressed. When there are no pending memory requests, the scoreboard 114 may provide an indication to the idle timer 112 to begin a countdown to close current pages.

In an implementation, the idle timer 112 is "dynamic", and as such, is configured to utilize techniques to close the pages and to address dynamically-changing code streams by tracking the previous decisions made on page closes. The idle timer 112, when so configured, may also adjust dynamically during operation to compensate for "bad" page close decisions as well as "good" decisions. For instance, the idle timer 112 may employ a "scaling" technique that transitions through a scale of predetermined timeout values based on previous decisions made to close pages, whether the decisions are "good" or "bad". Thus, the idle timer 112 may predict behavior of upcoming code streams based on previous code streams and adjust an idle time accordingly that is used to determine when to close the pages. A variety of other configurations for the idle timer 112 are also contemplated, such as non-dynamic idle timers that load a timeout value from a basic input/output system (BIOS) upon startup.

The scoreboard 114 may be implemented in a variety of ways, such as a rank/bank-based pending request scoreboard for out-of-order memory schedulers. The scoreboard 114 is implemented to provide an indication of whether there are pending cycles (e.g., read or write) to a particular rank/bank combination in the memory 106. For example, the queues 116 are configured to include requests for arbitration for clock cycles to memory 106. In practice, these queues may be relatively "deep" (i.e., provide for a significant amount of storage) as the deeper the queue is, the more out-of-order clock cycles that may be scheduled by the memory controller 108. Further, there may be a number of different queues 116, which together, provide for storage of a significant number of entries. The scoreboard 114 is configured to track requests entering and exiting across the queues 116 for an indication of an opened and unused rank/bank pair. When there are no pending requests for a particular rank/bank pair, the scoreboard 114 notifies the idle timer 112, which may then begin a countdown as previously described to close a current page that corresponds to the rank/bank pair. Further discussion of the operation of the scoreboard 114, queues 116 and idle timer 112 may be found in relation to the following figure. Although the exemplary implementation 100 of FIG. 1 illustrates components that are representative of functionality as separate, these components may be further combined (e.g., the processor 104 and memory controller 108 may be formed via the same die), divided, and so on without departing from the spirit and scope thereof.

Figure 2:
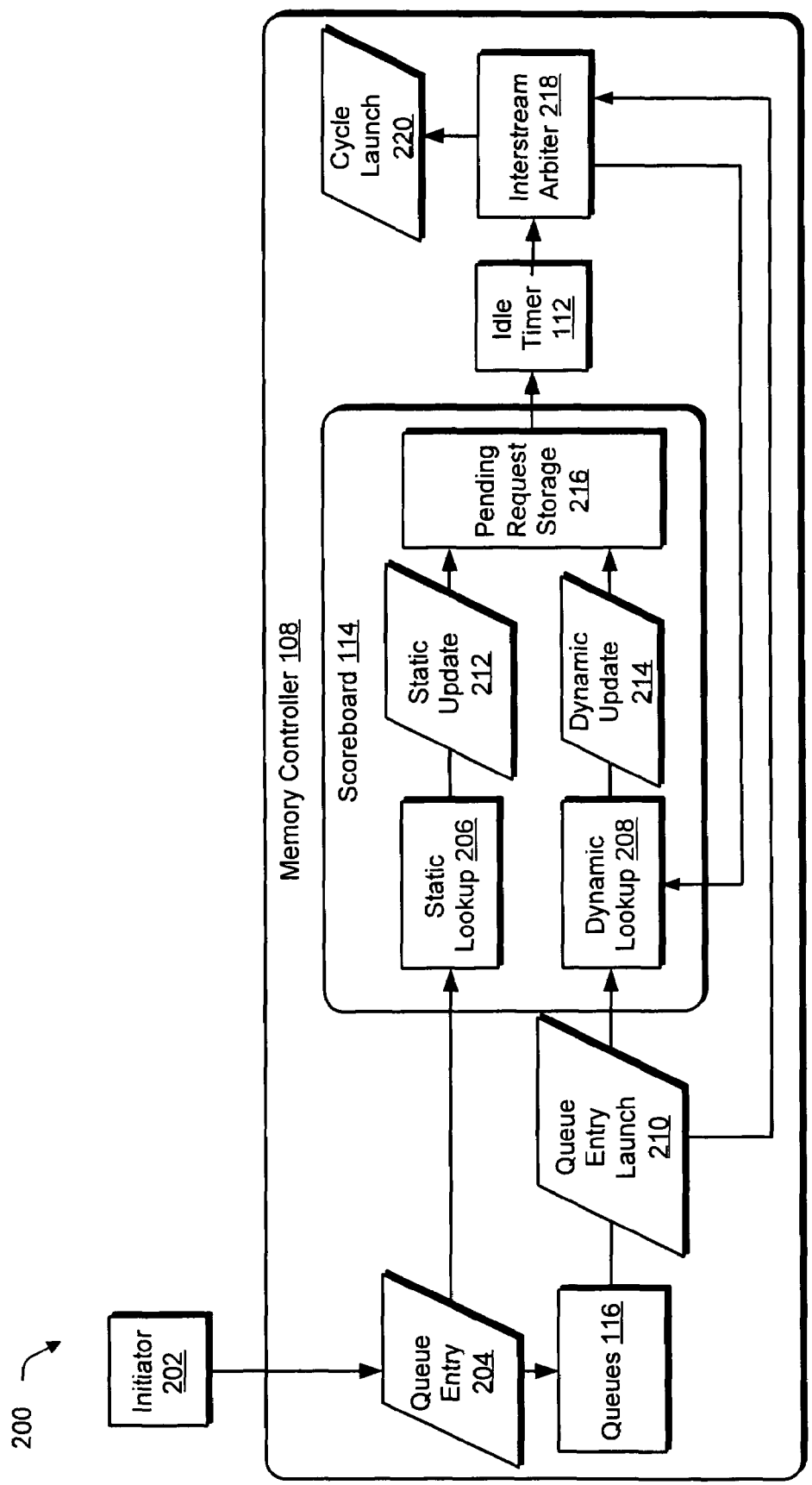
FIG. 2 is an illustration of an exemplary implementation showing a memory controller including an idle timer, scoreboard and queues of FIG. 1 in greater detail.

FIG. 2 is an illustration of an exemplary implementation 200 showing the memory controller 108 including the idle timer 112, the scoreboard 114 and the queues 116 of FIG. 1 in greater detail. An initiator 202 (e.g., the processor 104 of FIG. 1) is illustrated as providing a new queue entry 204 to the memory controller 108, which may be configured as a read or write memory request as previously described. The queue entry 204 is stored in one of the queues 116. Additionally, existence of the queue entry 204 is noted by a static lookup 206 device of the scoreboard 114. The queues 116, therefore, provide for out-of-order execution to store memory requests to be serviced.

The scoreboard 112 is illustrated as including a static lookup 206 device and a dynamic lookup 208 device (which hereinafter will be referenced as static lookup 206 and dynamic lookup 208, respectively). Static lookup 206 is notified each time a new queue entry is received to indicate that existence of the queue entry in the queues 116, further discussion of which may be found in relation to FIG. 3. The dynamic lookup 208 addresses out-of-order requests and receives information regarding queue entries 210 launched 210 from the queues 116, which may be provided by the interstream arbiter, such as through use of an interstream arbiter multiplexer that multiplexes the information to the dynamic lookup 208. For instance, the dynamic lookup 208 may update the pending request storage 216 as memory requests are executed from the queues 116, further discussion of which may be found in relation to FIG. 4. Thus, the static lookup 206 and the dynamic lookup 208 are configured to provide a static update 212 and a dynamic update 214 to pending request storage 216.

The scoreboard 114, through use of the pending request storage 216, presents the idle timer 112 with an indication when there are no pending requests to a particular rank/bank in each of the memory controller's 108 queues 116. The idle timer 112 is representative of a main counter to count a number of idle cycles for both opened and closed pages, which is duplicated for each rank/bank. The idle timer 112 will then begin the countdown from an idle timeout value and present a page close request to an interstream arbiter 218 for cycle launch when a countdown timer implementing the idle timeout value expires, e.g., a number of counts specified by the timeout value is reached.

Figure 3:
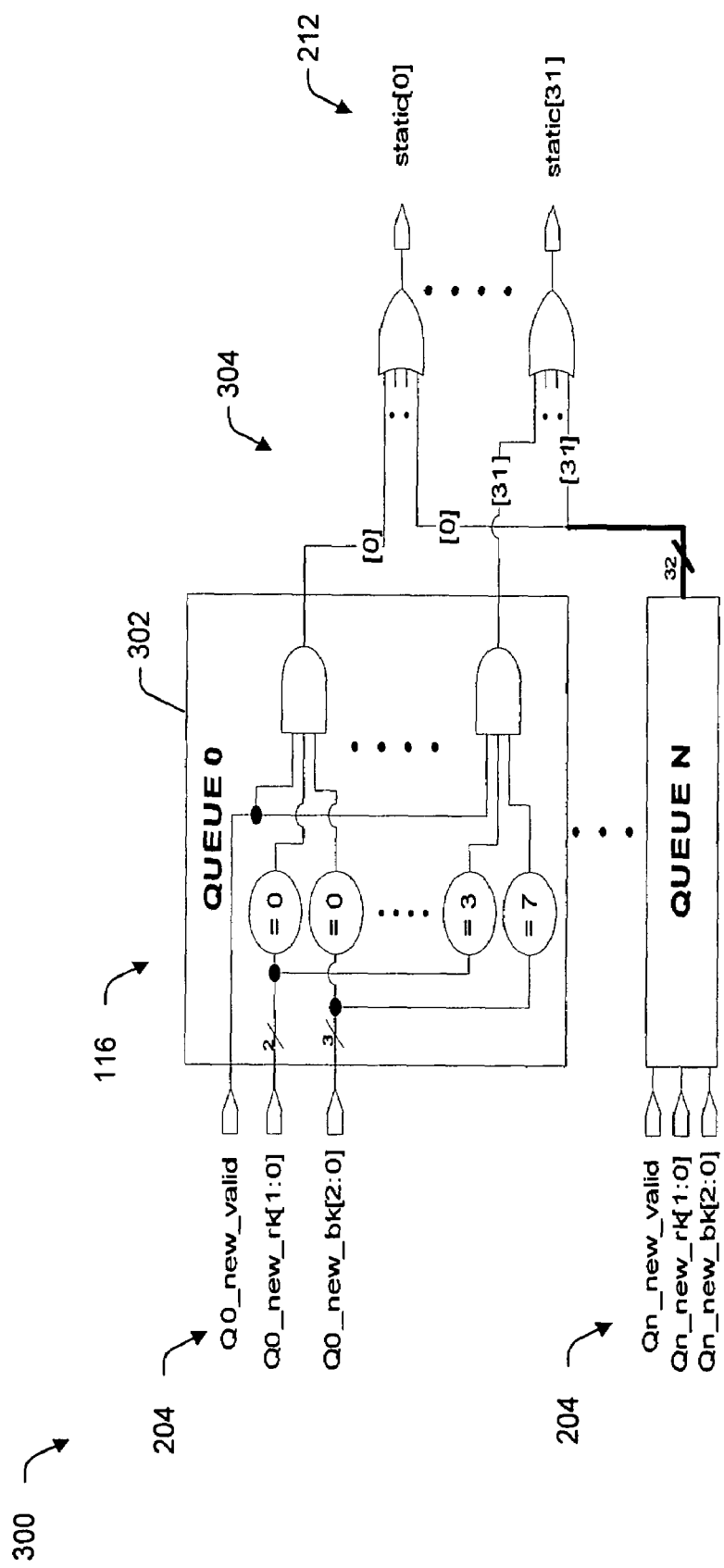
FIG. 3 is an illustration of an implementation of a static update of the scoreboard of FIG. 2.

FIG. 3 illustrates an implementation of a static update of the scoreboard 114. Logic included in the queues 116 of FIGS. 1 and 2 (e.g., from queue "0" to queue "N") is illustrated in FIG. 3 that is operable to decode information being stored into the queue entries. Each of the queues 116 receives a queue entry 204 that includes a "valid" indication (e.g., Q0_new_valid, Qn_new_valid) and an address of the data referenced by rank (e.g., Q0_new_rk[1:0]) and bank (e.g., Q0_new_bk[2:0]).

The scoreboard 114 is initially reset to '0'. Since static page lookup is done when an entry in a queue first becomes valid and both the rank and bank are compared, a request pending indication is generated by the static lookup 206 by decoding the rank/bank written into each entry of the queues 116. The indication is then "OR-ed" 304 from each of the queues 116 and written into the scoreboard 114 (e.g., written as "1" to the pending request storage 216) through use of the static updates 212.

In an implementation, the gate count of the static lookup 205 may be represented as follows:

$$N_{static} = N_{queue} \times (N_{rank} \times N_{bank} + N_{rank} + N_{bank}) + 32 \times (N_{queue}/3)$$

Where $N_{queue}$=Number of queues;
$N_{rank}$=Number of ranks; and
$N_{bank}$=Number of banks.

It should be apparent, however, that a wide variety of other implementations and gate counts are also contemplated.

Figure 4:
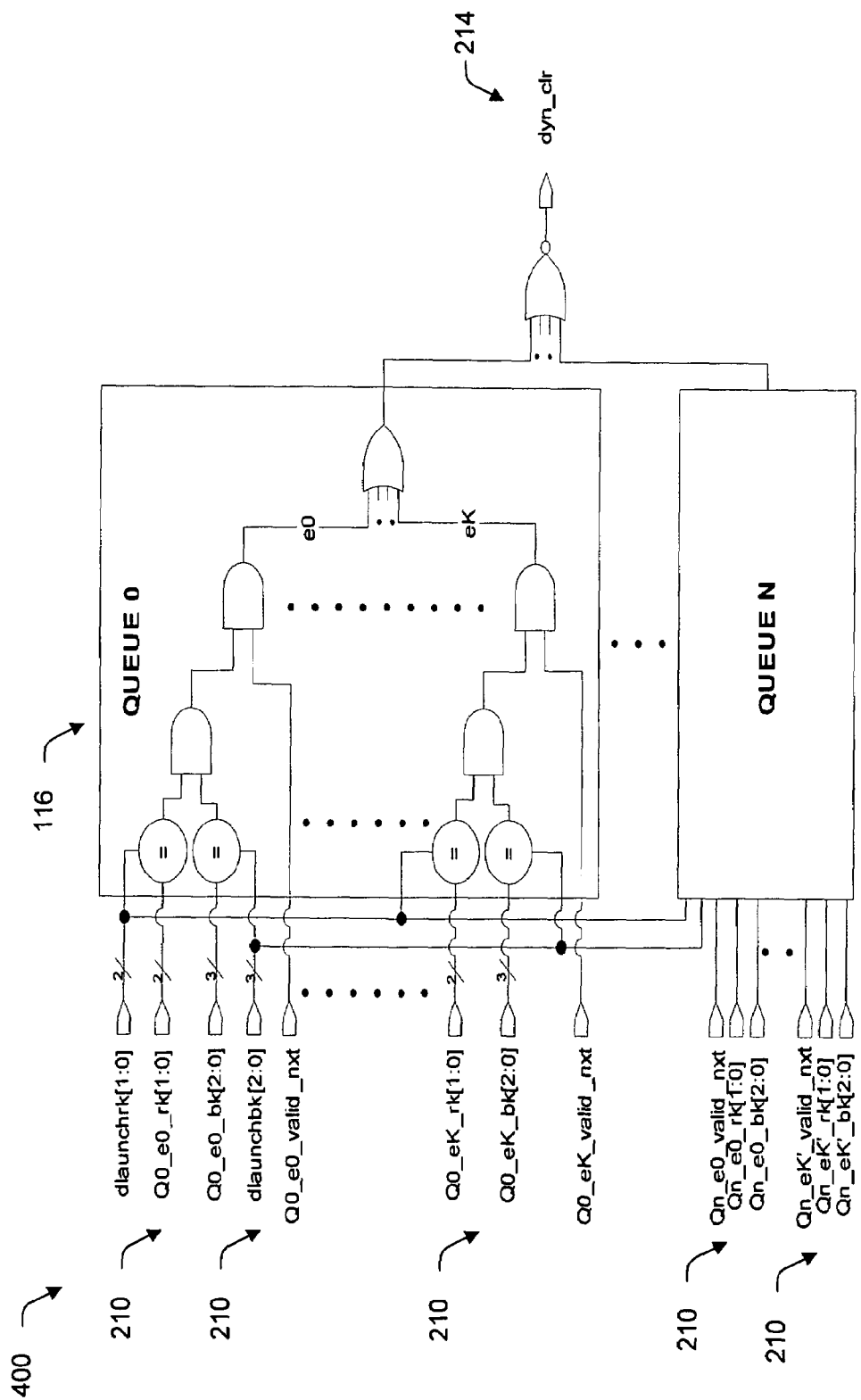
FIG. 4 is an illustration of an exemplary implementation of dynamic update of the scoreboard of FIG. 2.

FIG. 4 illustrates an exemplary implementation 400 of dynamic update of the scoreboard 114. Like FIG. 3, the queues 116 are illustrated as a plurality of queues, from queue "0" to queue "N". The queues 116 are illustrated as receiving a plurality of queue launches 210. Queue "0", in this instance, is illustrated as having "K" entries.

During dynamic page lookup (when a request is launched out-of-order), the rank/bank launched (i.e., the launched queue entry) is compared for a match in the rank/bank of each entry of the queues 116. If there is an exact match on the rank/bank and the entry in the queue is still valid on the next cycle, this indicates that there is still a pending valid cycle to that rank/bank. Thus, the rank/bank-based pending request scoreboard remains set to "1" by the dynamic lookup 208. Else, the scoreboard 114 (and more particularly the pending request storage 216) is cleared to "0" to indicate that there are no pending requests to that rank/bank in each of the queues 116. It should be noted that when there is a new request written to any entry in any of the queues that targets a matching rank/bank as a most recent cycle that was launched, the static request keeps the scoreboard bit set. When neither the static or dynamic updates are asserted, the scoreboard "remembers" the storage for that clock cycle.

In an implementation, the dynamic update gate count may be represented as follows:

$$N_{dynamic} = N_{queue} \times Q_{depth} \times (7+1/3) + (N_{queue}/3)$$

Where $N_{queue}$=Number of queues; and
$Q_{depth}$=Depth of the queues.

It should be apparent, however, that a wide variety of other implementations and gate counts are also contemplated.

Figure 5:
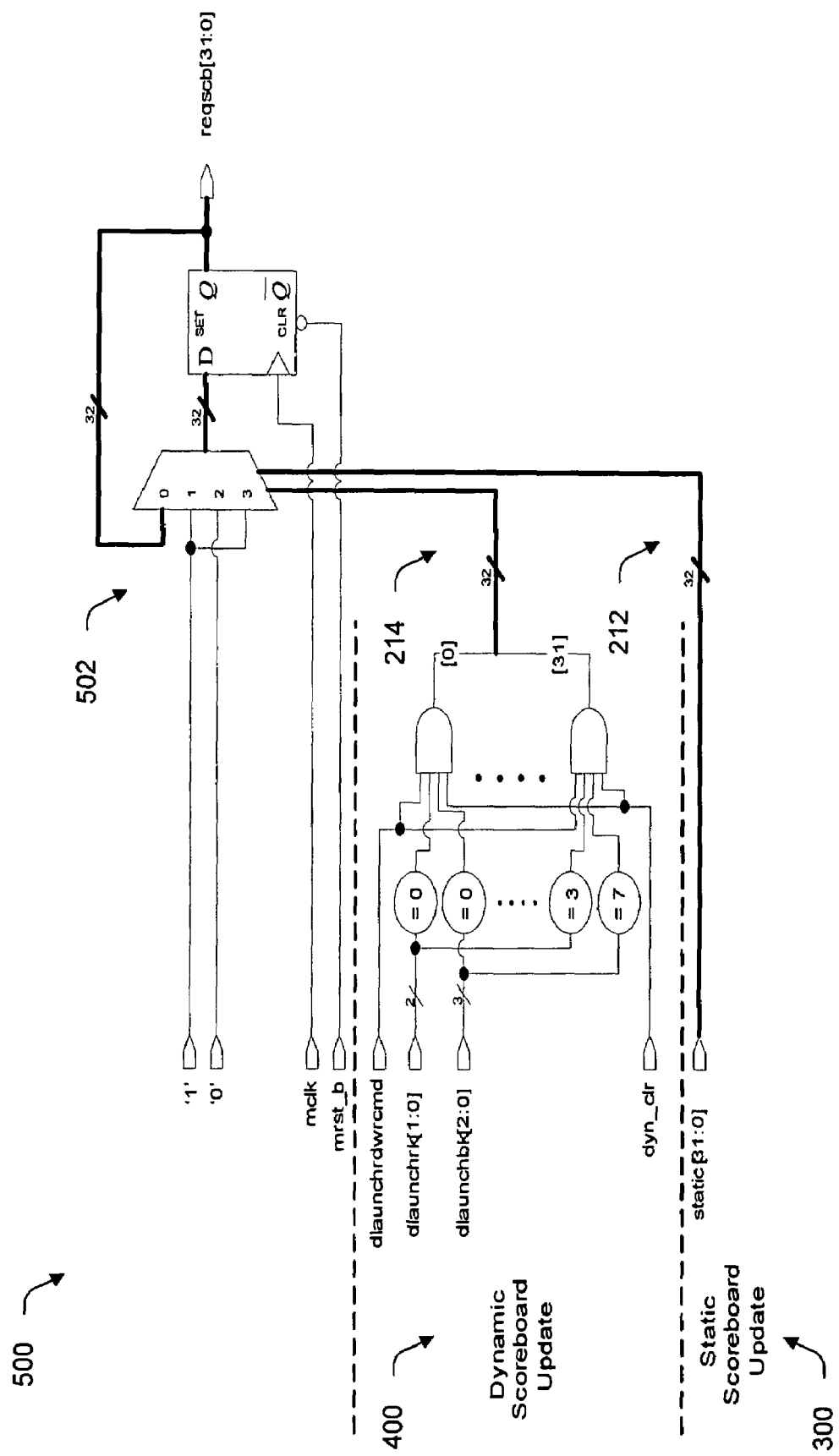
FIG. 5 is an illustration of a combined scoreboard implementation that includes the static and dynamic updates of FIGS. 3 and 4, respectively.

FIG. 5 illustrates a combined scoreboard implementation 500 that includes the static and dynamic updates of FIGS. 3 and 4, respectively. In the illustrated implementation, the combination of the static lookup 206 and dynamic lookup 208 yield a gate efficient dynamic scoreboard implementation. Final results for the scoreboard which describe whether request are pending for a rank/bank are obtained by multiplexing between static/dynamic updates 212, 214 versus scoreboard value retention.

Using the previous examples, the scoreboard 114 gate count may be calculated as follows:

$$N_{scb} = N_{static} + N_{dynamic} + 32 \times (N_{rank} + N_{bank} + 1) + 32 \times (10 + 10) = N_{queue} \times (N_{rank} \times N_{bank} + N_{rank} + N_{bank} + Q_{depth}(7+1/3)) + 33 \times (N_{queue}/3) + 32 \times (N_{rank} + N_{bank} + 1) + 640$$

Where $N_{queue}$=Number of queues;
$Q_{depth}$=Depth of the queues;
$N_{rank}$=Number of ranks; and
$N_{bank}$=Number of banks.

In this example, there are three read queues and three write queues, in which, $N_{rank}$ is equal to four and $N_{bank}$ is equal to eight. Two of the read queues are six "deep" and the other is two "deep". The two write queues are thirty-two "deep" with the other being three "deep". This yields an exemplary implementation of a gate count of approximately 1980 gates per DRAM channel. It should be apparent, however, that a wide variety of gate counts are contemplated.

Exemplary Procedures

The following discussion describes memory scoreboard techniques that may be implemented utilizing the previously described systems and devices. The procedures are shown as a set of blocks that specify operations performed by one or more devices and are not necessarily limited to the orders shown for performing the operations by the respective blocks.

Figure 6:
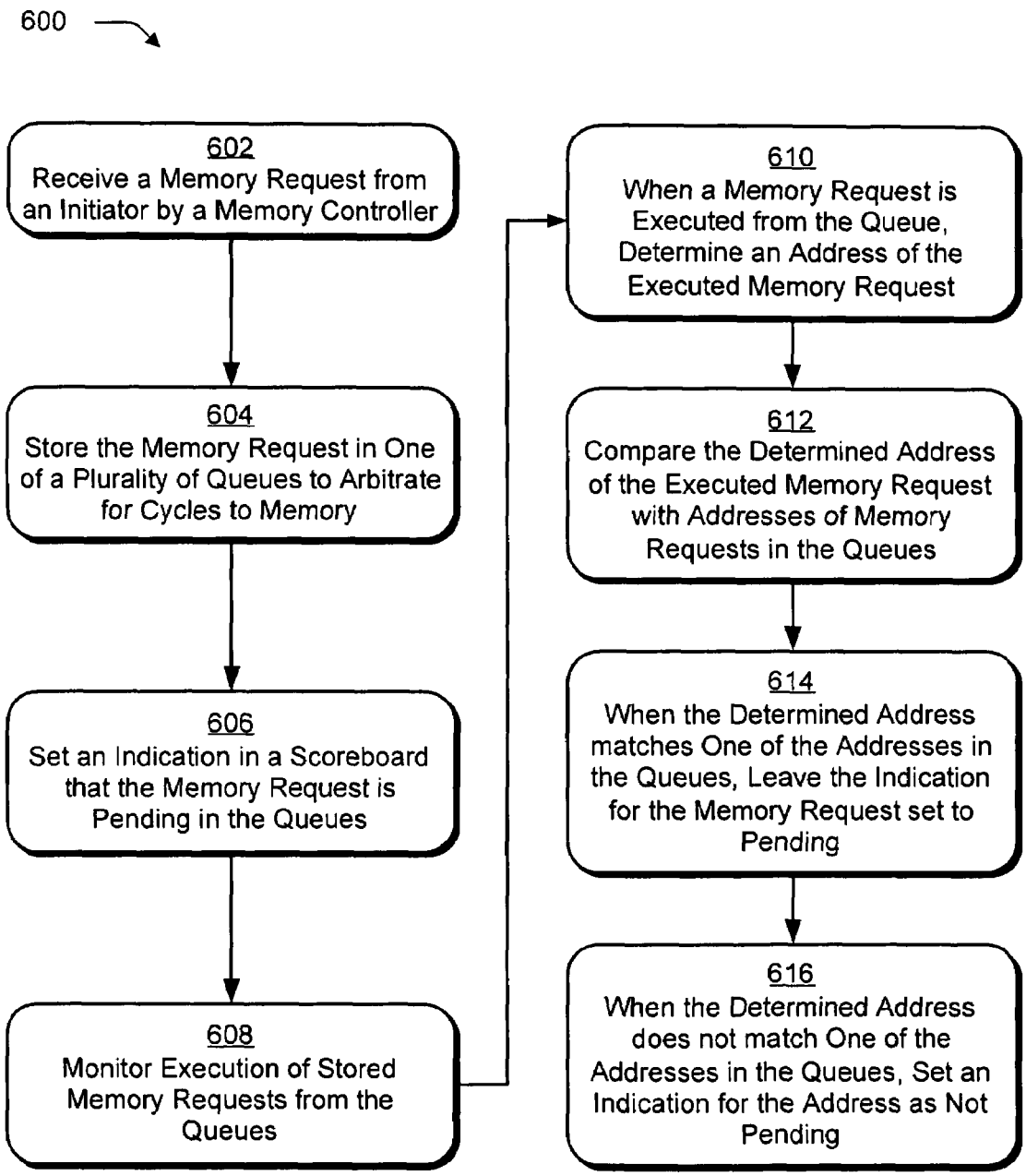
FIG. 6 is a flow diagram depicting a procedure in an exemplary implementation that may be employed by the memory controller of FIG. 1 to maintain a scoreboard using static and dynamic update techniques.

FIG. 6 depicts a procedure 600 in an exemplary implementation that may be employed by the memory controller 108 of FIG. 1 to maintain a scoreboard using static and dynamic update techniques. A memory request is received from an initiator by a memory controller (block 602). For example, the processor 104 may act as an initiator of a read or write memory request.

The memory request is stored in one of a plurality of queues to arbitrate for cycles to memory (block 604). An indication is also set in a scoreboard that indicates that the memory request is pending in the queues (block 606). For example, the static lookup 206 may provide an indication (e.g., a "1") as a static update 212 to the pending request storage 216 for the address of the request.

Execution of stored memory requests is monitored (block 608), such as through use of the dynamic lookup 208. When a memory request is executed from the queue, an address is determined for the executed memory request (block 610). The determined address of the executed memory request is compared with addresses of memory requests in the queues (block 612). In other words, the executed memory request (and more particularly its corresponding address) is compared with addresses of other memory requests that await execution.

When the determined address matches one of the addresses in the queue, the indication for the memory request is left as set to pending (block 614). However, when the determine address does not match address of memory requests that remain in the queues, an indication of not pending is set for the address in the scoreboard (block 616).

CONCLUSION

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

What is claimed is:

1. A memory controller comprising:
   a scoreboard, wherein the scoreboard provides, at least in part, indications of pending or not pending to an idle timer;
   a plurality of queues;

a static lookup device to provide an indication that an address of a received request is pending to the scoreboard when the request is received; and a dynamic lookup device to provide an indication of not pending to the scoreboard when the request is executed and when an address of the executed request does not match an address of another request that remains in the plurality of queues.

2. An apparatus as described in claim 1, wherein the requests are out-of-order memory requests.

3. An apparatus as described in claim 1, wherein each said address is to reference a respective rank and bank of memory that is communicatively coupled to the memory controller.

4. An apparatus as described in claim 1, wherein the idle timer is to stop a clock when a timeout value is reached.

5. An apparatus as described in claim 1, wherein the idle timer is to close pages having the address to memory when a timeout value is reached.

6. An apparatus as described in claim 5, wherein the idle timer is dynamic, such that, the timeout value is adjustable based on previous page close decisions.

7. An apparatus as described in claim 1, wherein the scoreboard includes a single entry for each said address in memory targeted by the requests.

8. An apparatus as described in claim 7, wherein:
the queues include a plurality of said requests having a single said address; and
one entry in the scoreboard indicates that the plurality of said requests are pending for the single said address.

9. A method comprising:
when a memory request is received by a memory controller, setting an indication of pending in a scoreboard to a corresponding address for the memory request;
when the memory request is executed and the address for the memory request does not match addresses of each other memory request that is pending in a queue, setting an indication of not pending for the address in the scoreboard; and
notifying an idle timer of an indication of not pending, wherein the idle timer is to close pages having the address to memory when a timeout value is reached.

10. A method as described in claim 9, wherein the setting of the indication of pending and the setting of the indication of not pending are performed by a memory controller.

11. A method as described in claim 9, wherein:
each of the addresses reference memory communicatively coupled to a memory controller that performs the settings; and
the memory is dynamic random access memory.

12. A method as described in claim 9, wherein the memory request and each other memory request are executable out-of-order.

13. A method as described in claim 9, wherein a single entry of the scoreboard is to track multiple said memory requests to a single said address.

14. A method as described in claim 9, wherein each said address references a page of memory.

15. A method as described in claim 9, wherein the idle timer is dynamic, such that, the timeout value is adjustable based on previous page close decisions.

16. A system comprising:
a cursor control device;
memory;
an idle timer;
a memory controller, communicatively coupled to the memory, that includes a scoreboard to track whether each page of the memory has a pending memory request in a queue using a single respective entry in the scoreboard; and
a processor communicatively coupled to the cursor control device and the memory controller, wherein the processor is to provide the memory request in response to an input received from the cursor control device.

17. A system as described in claim 16, wherein the memory controller comprises:
a static lookup device to provide an indication of pending to the scoreboard that indicates that an address of a received memory request is pending when the memory request is received; and
a dynamic lookup device to provide an indication of not pending to the scoreboard when the memory request is launched out-of-order and when an address of the launched memory request does not match an address of another memory request that remains in the queue.

18. A system as described in claim 16, wherein each pending memory request is executable out-of-order by the memory controller.

* * * * *